Patented Sept. 15, 1931

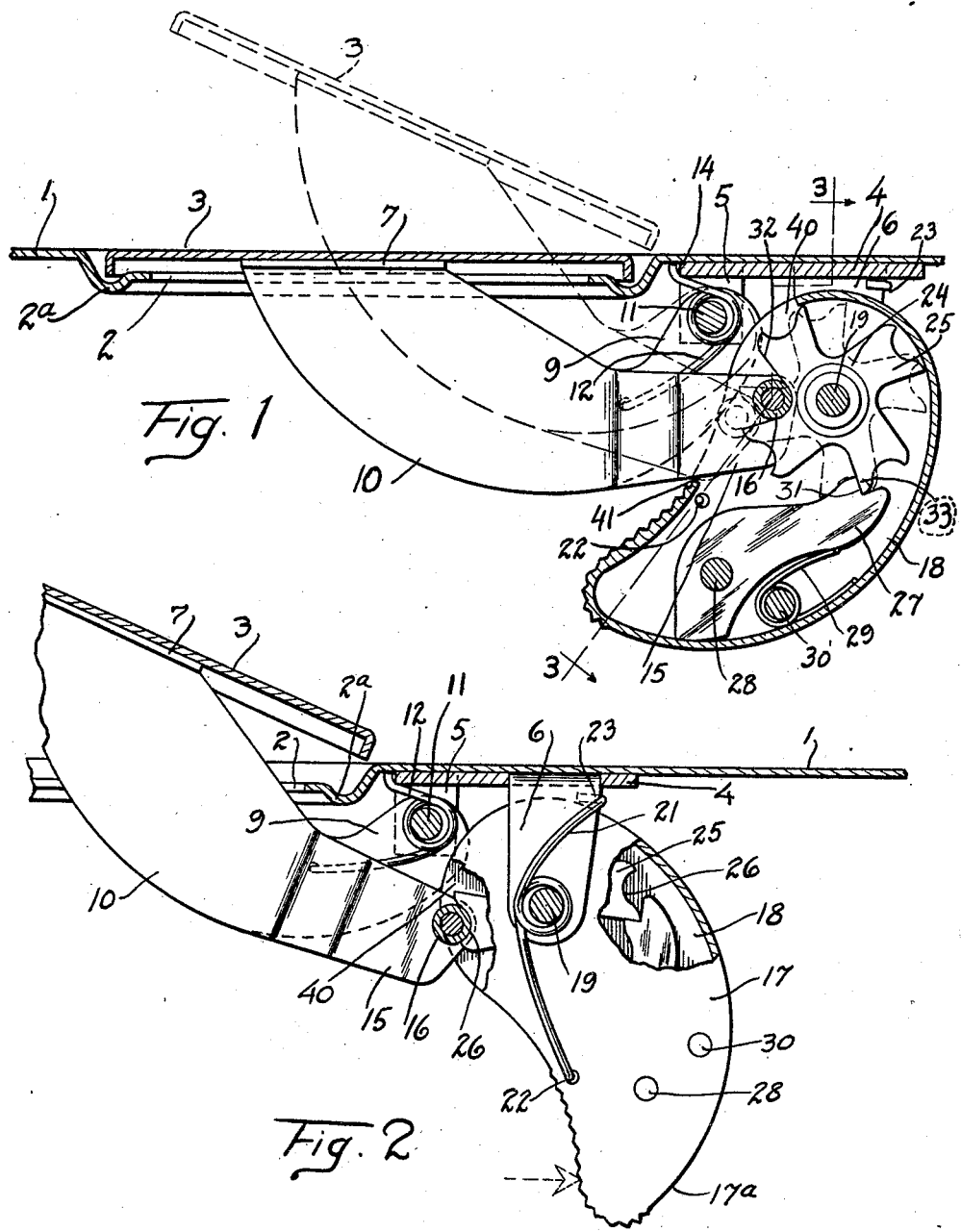

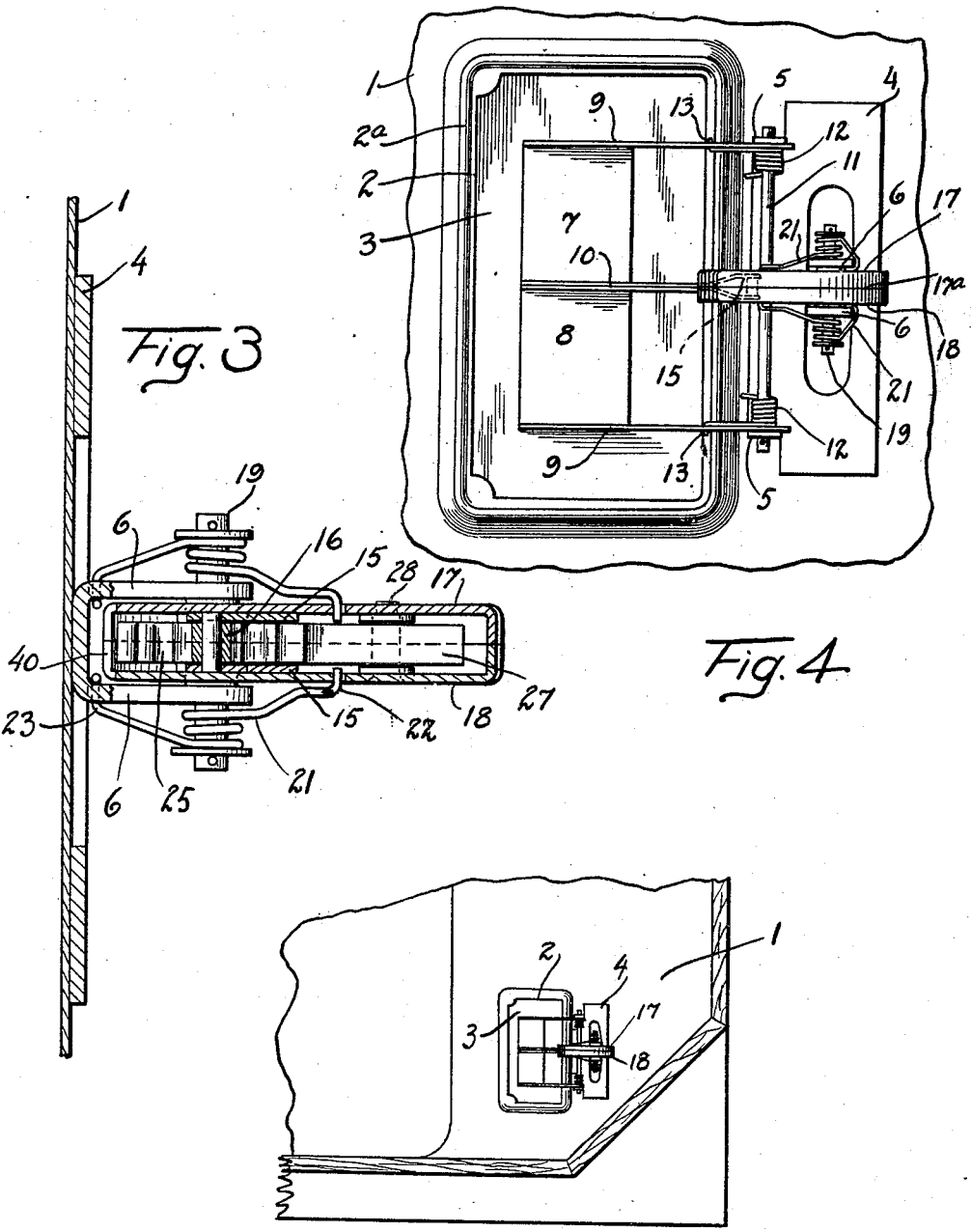

1,823,191

UNITED STATES PATENT OFFICE

CARL G. CRONWALL, OF DETROIT, MICHIGAN, ASSIGNOR TO GENERAL MOTORS CORPORATION, OF DETROIT, MICHIGAN, A CORPORATION OF DELAWARE

KICK VENTILATOR FOR VEHICLES

Application filed May 15, 1929. Serial No. 363,167.

This invention relates to a kick ventilator for vehicles.

In side ventilators for automotive vehicles it is a common practice to push the foot lever forward to open the ventilator and to pull the lever back with the toe to close the ventilator. Owing to the stiffness of the spring against which the foot lever acts, the foot lever is not readily drawn back by the toe and this often results in the marring and scratching of the toe portion of the operator's shoe.

It is the object of this invention to present a ventilator of such a nature that it may be opened or closed by a unidirectional operation of the foot lever, that is, the foot lever is pushed or kicked forward to open the ventilator and is also pushed or kicked forward to close the ventilator.

It is understood that as herein used the term automotive vehicle includes passenger automobiles, trucks, airplanes, and railroad passenger cars, or other similar vehicles.

In the drawings:

Fig. 1 is a section through the ventilator when in closed position.

Fig. 2 is an elevation partly in section and partly broken away showing the ventilator in opened position.

Fig. 3 is a section along the line 3—3 of Fig. 1.

Fig. 4 is an elevation of the ventilator assembled to a vehicle body.

Fig. 5 shows the ventilator assembled in operative position to the cowl of an automobile.

In the drawings, the cowl for an automobile may be referenced 1. For purposes of ventilation the cowl has therein the opening 2 which is encompassed by the closure seat 2a. This opening is arranged to be closed by a pivoted closure 3 when the closure is seated on the closure seat 2a. The cowl has spot-welded or secured thereto in any suitable manner, the support plate 4 which carries the struck-out lugs 5 and 6. The closure member 3 has suitably secured thereto the plates 7 and 8 which have the two end arms 9 and the intermediate arms 10. The arms 9 are pivotally mounted on the shaft 11 which is carried by the lugs 5. The shaft 11 also carries the coil springs 12 each having one bent end hooked into the arm 9 as at 13 and the other hooked end abutting against the side of the plate 4 as at 14. The expansive force of these springs normally maintains the closure in closed position as shown in Fig. 1.

As shown in Fig. 4, the arms 10 have the diverging ends 15 which carry therebetween the roller 16.

The operating or kick lever may be generally referenced 17a and consists of the outer shell members 17 and 18 which are pivotally mounted upon the pin 19 which in turn is carried by the struck-in lugs 6. The pin 19 also carries the coil springs 21 each of which has one end hooked into the lever as at 22 and the other end of which is hooked about the support lug 6 as at 23. The coil springs 21 are arranged to force the lever in the direction opposite to that indicated by the arrow in Fig. 2.

Rotatively mounted upon the pin 19 and within the shell members 17 and 18 of the lever, is the star wheel 24 which has the arms 25, the ridges of which are recessed as at 26. The lever 17a has the opening 40 through which the arms 10 of the closure project to place the roller 16 in engagement with the star wheel. For the purpose of turning the star wheel 24, the lever has mounted therein the dog 27 which pivots about the pin 28. The dog 27 is held against the star wheel by the spring 29 which is mounted upon the pin 30. The end of the pins 28 and 30 are riveted and hence fix the plates 17 and 18 together.

The operation of the device is nicely brought out in Figs. 1 and 2. When the closure 3 is in closed position, the roller 16 is held in the position shown in Fig. 1 between two adjacent arms 25 of the star wheel and the lever 17a abuts against the arms 10 as at 41. Upon the lever 17a being moved in the direction of the arrow (Fig. 2), the dog 27 engages one of the arms 25 of the star wheel as at 31, and causes the star wheel to move in a counter clockwise direction which in turn causes the roller 16 to roll up the cam surface 32 and pass over the top of the star arm and seat itself in the recess 26 as shown in Fig. 2. Owing to the engagement of the roller 16 with the cam surface of the star arm, the closure member 3 is caused to open. The opened position of the closure member is also indicated by the dotted lines in Fig. 1.

After the lever has been pressed as far as possible in the direction indicated by the arrow (Fig. 2), it may be released and the springs 21 will force it back into its original position (Fig. 1). At this time the dog engages in the recess of a star arm as indicated in the dotted lines in Fig. 1 as at 33. At this time the roller 16 is in a recess 26 of a star arm as shown in Fig. 2 and as shown in the dotted lines in Fig. 1.

When the closure 3 is opened and the roller 16 is in the recess 26 as shown in Fig. 2, the expansive force of the springs 12 urge the roller, which is mounted between the arms 10 of the closure, to swing about shaft 11 as a pivot in a counter-clockwise direction. Since the arms 10 and the roller 16 revolve about the shaft 11 as a center and are pressed counter-clockwise by the springs 12 and since the arm 25 of the star wheel rotates about the pin 19 as a center, there is presented a triangular arrangement wherein the sum of the distances from the shaft 11 to the roller 16 and from the roller 16 to the pin 19 is greater than the distance between the shaft 11 and the pin 19, hence, the star wheel 24 is unable to rotate in a clockwise direction and therefore the closure 3 remains in opened position.

Upon again actuating the lever 17a in the direction of the arrow, the roller 16 climbs out of a recess 26 in an arm 25 of the star wheel over the end of the arm and then rolls into a furrow between two adjacent arms of the star wheel as shown in Fig. 1, and hence, the ventilator is closed.

It is evident from the above description that there is here produced a ventilator that is readily opened or closed by a forward push or kick of the foot lever.

What I claim is:

1. In a ventilator for an automotive vehicle, or the like, the combination of a closure seat, of a movable closure, and of means including a lever, a star wheel movable relative to the said lever, and a dog carried by said lever arranged to be operated unidirectionally for moving said movable closure to open or close the said ventilator.

2. In a ventilator for an automotive vehicle, or the like, the combination of a closure seat, of a movable closure, a star wheel therefor, engaging means associated with the movable member and engaging the star wheel, and means for moving the star wheel to position a furrow or ridge to be engaged by the said engaging means whereby to position the movable closure in either of two positions.

3. In a ventilator for an automotive vehicle, or the like, the combination of a closure seat, of a movable closure, a star wheel, engaging means associated with the movable closure which engages the star wheel, and means including a dog for moving the said star wheel to position a furrow or ridge of the star wheel to be engaged by the said means whereby to position the movable closure in either of two positions.

4. In a ventilator for an automotive vehicle, or the like, the combination of a closure seat, of a movable closure, a member having an undulated surface, engaging means associated with the movable closure and engaging the undulated surface, and a lever carrying a dog for moving the said member to position a furrow or ridge of the undulated surface to be engaged by the said engaging means whereby to position the movable closure in either of two positions.

5. In a ventilator for an automotive vehicle, or the like, the combination of a closure seat, of a movable closure, resilient means for resisting movement of the said movable closure, a member having an undulated surface, engaging means associated with the movable closure and engaging the undulated surface, means for moving the said member to position a furrow or ridge of the undulated surface to be engaged by the said engaging means whereby to position the movable closure in either of two positions, and a second resilient means for resisting movement of the said means.

6. In a ventilator for an automotive vehicle, or the like, having a closure seat, and a movable closure therefor, means for moving the said closure to open or close the said ventilator including a hollow lever, a star wheel, and a dog, the said dog and star wheel being mounted within the said lever.

7. In a ventilator for an automotive vehicle, or the like, having a closure seat and a movable closure therefor, a lever and a star wheel having a recessed arm for moving the said closure, the said star wheel and lever being relatively movable about a common pivot.

8. In a ventilator for an automotive vehicle, or the like, having a closure seat and a movable closure therefor, the combination of a star wheel, a hollow lever, a dog and resilient means for maintaining the said dog in contact with the said star wheel, said star wheel, dog, and resilient means being mounted within the hollow lever.

In testimony whereof I affix my signature.

CARL G. CRONWALL.